United States Patent [19]

Munekata et al.

[11] Patent Number: 4,513,366
[45] Date of Patent: Apr. 23, 1985

[54] MENU PROGRAMMED MACHINE TOOL NUMERICAL CONTROLLER WITH AN INTERFERENCE CHECKING FUNCTION

[75] Inventors: Kenichi Munekata; Yoshio Doi, both of Kariya; Isao Suzuki, Okazaki; Shigeru Doi, Nagoya, all of Japan

[73] Assignee: Toyoda Koki Kabushiki Kaisha, Kariya, Japan

[21] Appl. No.: 475,509

[22] Filed: Mar. 15, 1983

[30] Foreign Application Priority Data

Mar. 23, 1982 [JP] Japan ................... 57-45945

[51] Int. Cl.³ .................. G05B 23/02; G05B 9/02
[52] U.S. Cl. .................... 364/167; 364/171; 364/474; 364/475; 364/184; 364/191; 364/192; 364/188; 318/563; 318/568; 82/2 B
[58] Field of Search ............ 364/474, 475, 167, 169, 364/171, 170, 184, 188, 186, 191, 192, 193; 340/825.23; 82/2 B; 318/563, 565, 568, 571, 572; 73/104; 408/8-13

[56] References Cited

U.S. PATENT DOCUMENTS 4,131,836 12/1978 Noda ................. 340/825.23
4,150,326 4/1979 Engleberger et al. ......... 318/568 X
4,412,162 10/1983 Kitamura ............... 318/563

*Primary Examiner*—Jerry Smith
*Assistant Examiner*—Allen MacDonald
*Attorney, Agent, or Firm*—Oblon, Fisher, Spivak, McClelland & Maier

[57] ABSTRACT

A numerical controller for a machining center comprising a microprocessor connected to a data input device, a CRT display device and a data storage device. The microprocessor prepares an NC program for a workpiece to be machined, based upon machining information manually input by the use of the data input device and stored in the data storage device. The debugging of the prepared NC program is then executed, wherein the microprocessor obtains by calculation a workpiece interference space defined outwardly from the outer periphery of the workpiece, based upon workpiece blank shape and dimension data and workpiece mounting position data stored in the data storage device. The microprocessor further calculates, based upon the NC program, a tool path along which a tool spindle of the machining center would be moved relative to a work table in accordance with the NC program. The microprocessor ascertains based upon the tool path, a tool interference space, defined outwardly from the outer periphery of each tool, and the workpiece interference space, whether or not the tool interference space would enter the workpiece interference space in any rapid feed movement if relative movement between the tool spindle and the work table were effected in accordance with the NC program. When detecting the entry of the tool interference space into the workpiece interference space, the microprocessor displays on the CRT screen a message informing an operator of the occurrence of an interference.

4 Claims, 29 Drawing Figures

MENU PROGRAMMED MACHINE TOOL NUMERICAL CONTROLLER WITH AN INTERFERENCE CHECKING FUNCTION

BACKGROUND OF THE INVENTION

1. Field of the Invention

The present invention relates to a machine tool numerical controller which is capable of checking as to the interference of a cutting tool with a workpiece the relative movement between which is controlled in accordance with a numerical control program.

2. Description of the Prior Art

Generally, when a workpiece is machined in a numerically controlled machine tool called a "machining center", programming errors involved in the numerical control program (hereafter referred to as an "NC program") may cause a cutting tool to be brought into engagement with the workpiece at a rapid feed rate, thus causing damage to the workpiece and the cutting tool. To avoid this, an initial program debugging must be performed upon completion of preparation of the NC program and in advance of the initial operation of the machine tool in a continuous run mode according to the prepared NC program. The program debugging is done by actually operating the machine tool in a single block mode in accordance with the NC program so as to ascertain whether or not the cutting tool is brought into engagement with the workpiece at a rapid feed rate.

Such program debugging is however impossible to perform while the machine tool is in operation for machining another workpiece in accordance with a different NC program, and therefore, disadvantageously leads to inefficient use of the machine tool. Further, during the program debugging, a programmer or operator has to decide whether or not the cutting tool will come into contact with the workpiece, before the contact actually occurs. During the program debugging, the machine tool must therefore be moved at a considerably slower feed rate than that given in the NC program, and a long period of time is spent for such program debugging. More particularly, workpieces machined by machining centers have protrusions and cavities of various shapes and are more complicated in shape than those machined by lathes or turning machines. Thus, the programming of NC programs for the workpieces machined by machining centers is more likely to involve errors, and a method for checking the NC programs for such errors is presently unavailable except for actually operating the machining centers in accordancwe with the NC programs.

There has also been technology developed for checking whether or not a workpiece interferes with other machine tool components such as, for example, a spindle head, a tool support and the like when the tool is directed against the workpiece to effect machinings thereon. However, the conventional interference checking technology is designed to check the interference between two relatively movable objects which should not normally occur, and an interference space is set to define an area in which the movable objects are absolutely prevented from entering. Accordingly, it is impossible to use the conventional interference checking technology to check for interference or rapid feed engagement between a tool and a workpiece, because it is impossible to direct the tool against the workpiece.

SUMMARY OF THE INVENTION

It is therefore a primary object of the present invention to provide an improved machine tool numerical controller capable of preventing a cutting tool from coming into engagement with a workpiece at any higher feed rate such as a rapid feed rate than various cutting feed rates.

Another object of the present invention is to provide an improved machine tool numerical controller capable of executing the debugging of an NC program in a short period of time by defining an interference space which prevents engagement of a cutting tool with a workpiece only during the rapid feed positioning movement.

Another object of the present invention is to provide an improved machine tool numerical controller wherein without actually operating a machine tool in accordance with an NC program, the debugging of the NC program is executed by ascertaining, by calculation, whether one of a tool and a tool interference space defined outwardly of the outer periphery of the tool would interfere with a workpiece interference space defined outwardly of the outer periphery of a workpiece if relative movement between the tool and the workpiece were controlled in accordance with the NC program.

A further object of the present invention is to provide an improved machine tool numerical controller wherein a workpiece interference space which is defined outwardly of the outer periphery of a workpiece to be machined for inhibiting entry of a cutting tool thereinto in rapid feed positioning movement is automatically defined based upon data indicating the blank shape and dimension of the workpiece and data indicating a mounting position of the workpiece on a machine tool work table.

Briefly, according to the present invention, there is provided a machine tool numerical controller comprising a data input device, a data storage device, a calculation device and an interference detection device. The data input device is provided for inputting blank shape data and mounting position data for storage in the data storage device. The blank shape data defines the blank shape and dimensions of a workpiece to be machined by a machine tool, and the mounting position data defines a mounting position of the workpiece on a work table of the machine tool. The data storage device stores an NC program in addition to the blank shape data and the mounting position data. The calculation device defines by calculation a workpiece interference space outwardly of the outer periphery of the workpiece, based upon the blank shape data and the mounting position data stored in the data storage device. The interference detection device determines whether one of the tool and a tool interference space defined outwardly of the outer periphery of the tool enters the workpiece interference space during rapid feed positioning movement, by calculation or through actual relative movement between a tool spindle carrying the tool and the work table in accordance with the NC program.

With this configuration, since the workpiece interference space is automatically defined, manual data input by an operator is unnecessary for the definition of the workpiece interference space, and therefore errors associated with manual input data can be prevented. Consequently, the debugging of the NC program can be reliably executed in a short period of time. Particularly, since both the blank shape data and the mounting position data are used to define the workpiece interference space, a position on the work table where the workpiece interference space is generated can be automatically shifted with a change in the mounting position of the workpiece on the work table. Furthermore, the occurrence of an interference between the tool and the workpiece is determined actually or by calculation when either the tool or the tool interference space enters into the workpiece interference space at a rapid feed rate. Accordingly, the tool is prevented from coming into engagement with the workpiece at the rapid feed rate when the debugging of the NC program is executed by actually operating the machine tool in accordance with the NC program or when the machine tool is operated in accordance with the NC program for the machining of the workpiece. Therefore, it is possible from a practical standpoint to execute the debugging of the NC program with the machine tool being operated at the feed rate as designated in the NC program.

In another embodiment of the present invention, another calculation device is provided for calculating a tool path along which the tool spindle would be moved relative to the work table in accordance with the NC program. The interference detection device in this embodiment detects whether either the tool or the tool interference space would be engaged with the workpiece interference space in any rapid feed positioning movement if the relative movement between the tool spindle and the work table were controlled in accordance with the NC program. Since the detection by the interference detection device is done by calculation based upon the tool path and the tool and workpiece interference spaces, the debugging of the NC program can be executed without actually operating the machine tool in accordance with the NC program.

BRIEF DESCRIPTION OF THE DRAWINGS

The foregoing and various other objects and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 13 is an explanatory view showing an NC program prepared and used for machining the workpiece shown in FIGS. 12(a) and 12(b);

DETAILED DESCRIPTION OF THE PREFERRED EMBODIMENTS

Figure 1:
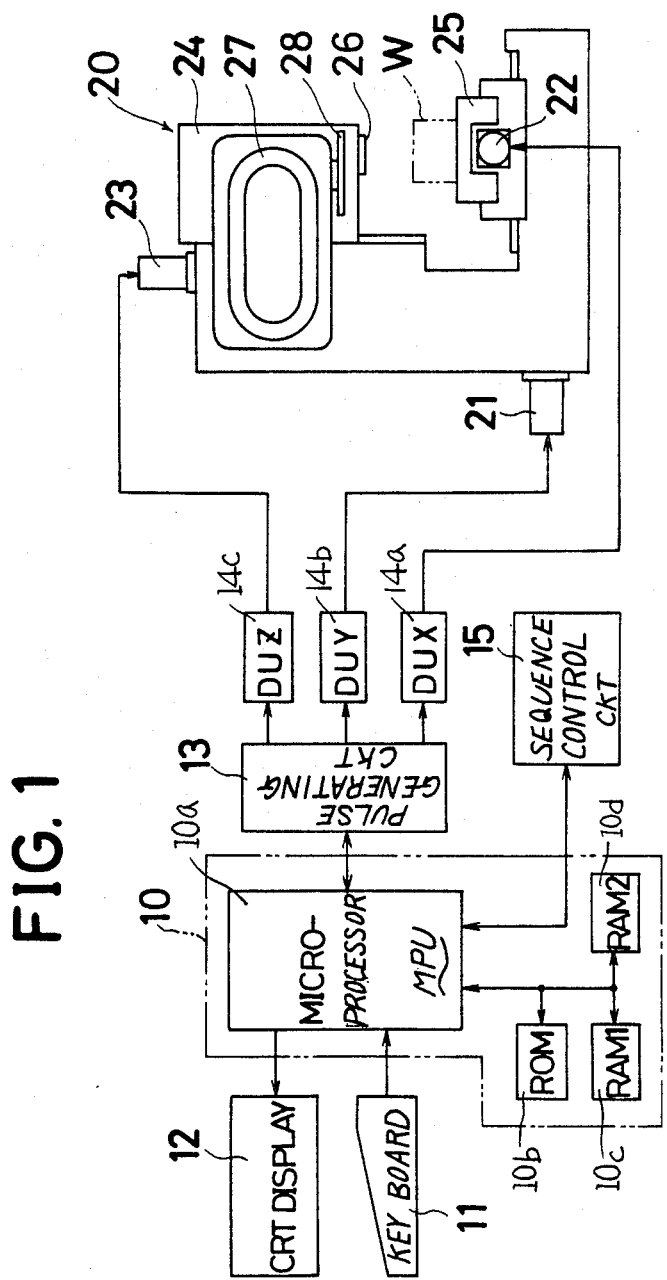
FIG. 1 is a general block diagram of a machine tool numerical controller according to the present invention, also showing a schematic elevational view of a machine tool controllable by the numerical controller.

Referring now to FIG. 1, a central processing unit 10, which constitutes a main component of a numerical controller is illustrated. The processing unit 10 is comprised of a microprocessor MPU 10a, a read-only memory ROM 10b, a battery-supported random access memory RAM 10c free from volatility, and a random access memory RAM 10d used for a data buffer. The microprocessor MPU 10a is connected through interface circuits, not shown, to a keyboard 11 used as a data input means, a CRT display unit 12 serving as a data display means, a pulse generating circuit 13 for distributing command pulses to servomotor drive circuits DUX 14a, DUY 14b and DUZ 14c, and a sequence control circuit 15.

A machining center 20 controllable by the numerical controller is provided with servomotors 21, 22 and 23, respectively connected to the drive circuits DUY 14b, DUX 14a and DUZ 14c. The relative position between the work table 25 for supporting a workpiece W and a spindle head 24 rotatably carrying a tool spindle 26 is altered in three directions each perpendicular to one another when the servomotors 21–23 are rotated. The machining center 20 is also provided with a tool magazine 27 for removably storing a plurality of diverse tools and an automatic tool exchanger 28. The tool exchanger 28 exchanges a tool in the tool spindle 26 with one of the tools selectively presented by a magazine indexing device, not shown, to a tool change position in the tool magazine 27, whereby the workpiece W can be machined with the diverse tools selectively received in the tool spindle 26.

Figure 2:
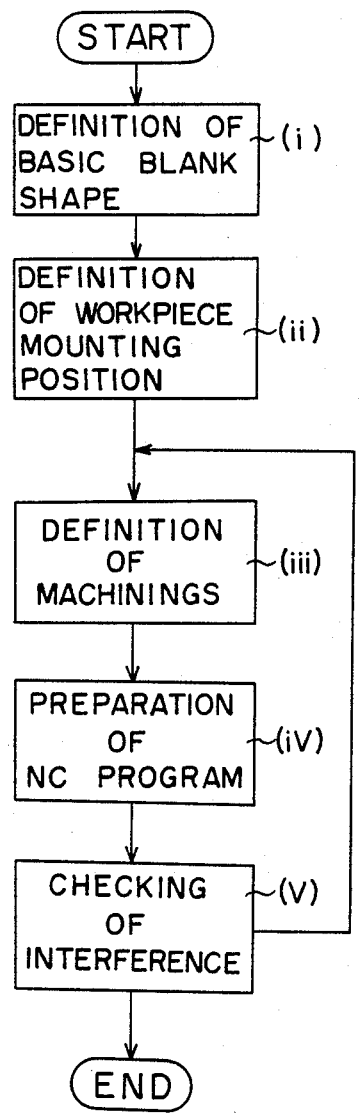
FIG. 2 is a general flow chart of a part of the system control program executed by the microprocessor shown in FIG. 1.
Figure 7:
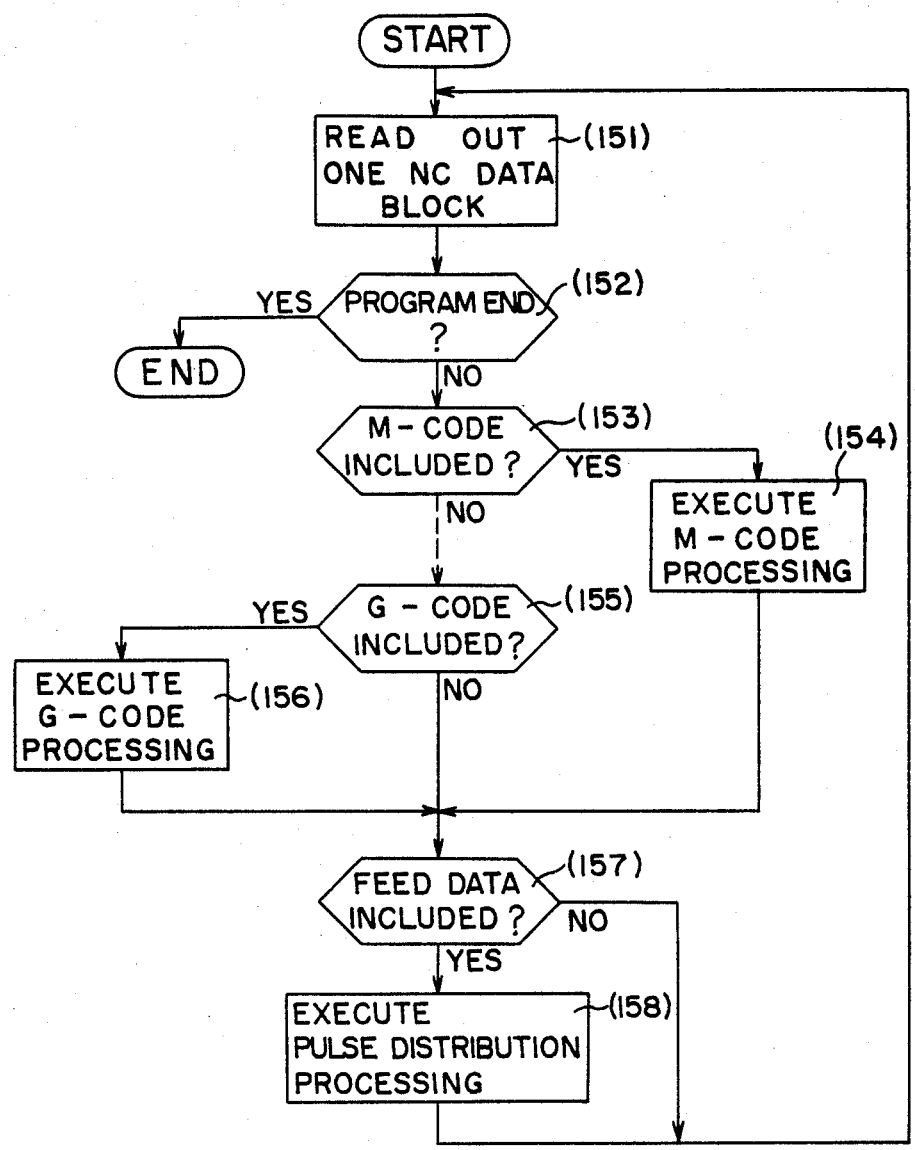
FIG. 7 is a specific flow chart of a numerical control execution routine executed by the microprocessor to numerically control the machine tool in accordance with an NC program.

The central processing unit 10 is operated in accordance with a system control program stored in the read-only memory ROM 10b to selectively perform an automatic programming function and a numerical control function. The processing unit 10, in the automatic programming function, prepares a numerical control program (hereafter referred to as NC program) based upon required machining information or data which is input by the keyboard 11 in a conversational mode. The numerical control function of the MPU 10 controls the machine tool 20, i.e., the servomotors 21-23, the magazine indexing device, the tool exchanger 28, a tool spindle drive motor, not shown, and the like, in accordance with the prepared NC program. In this particular embodiment, the automatic programming function and the numerical control function are performed by the single microprocessor MPU as follows:

That is, the microprocessor MPU 10 first executes an automatic programming routine generally shown in FIG. 2 to prepare an NC program for use in machining a workpiece W and to store it in an NC data area of the random access memory RAM 10c. Thereafter, the microprocessor MPU 10 executes a numerical control routine shown in FIG. 7 to control the operation of the machine tool 20 in accordance with the NC program stored in the NC data area in the memory RAM 10c.

The microprocessor MPU 10, when executing the numerical control routine, reads out the NC data constituting the NC program from the random access memory RAM 10c block by block and in accordance with each read-out NC data block, enables the pulse generating circuit 13 to distribute feed pulses to any of the servomotor drive circuits DUX 14a, DUY 14b and DUZ 14c and simultaneously, enables the sequence control circuit 15 to perform an auxiliary control operation such as, for example, a magazine indexing operation, a tool exchange operation, a spindle stop or the like. Such numerical control operation of the microprocessor MPU 10 is the same as that of a conventional computerized numerical controller known as a "CNC". Accordingly, the details of the numerical control operation the microprocessor MPU 10 performs is omitted herein, and the automatic programming function of the microprocessor MPU 10 will be described hereinafter in detail.

As shown in FIG. 2, processings that the microprocessor MPU 10 executes in the automatic programming function are roughly classified into five steps (i–v) including: defining the shape of an unfinished workpiece, defining the mounting position of the workpiece relative to a machine origin, defining machinings, preparing an NC program and checking interferences. The microprocessor MPU 10, when detecting an interference in the interference checking step (v), returns its processing to the machining definition step (iii) and enables the operator to revise the defined machining or machinings concerned. The foregoing five steps are executed in order as described hereinafter.

Figure 3A:
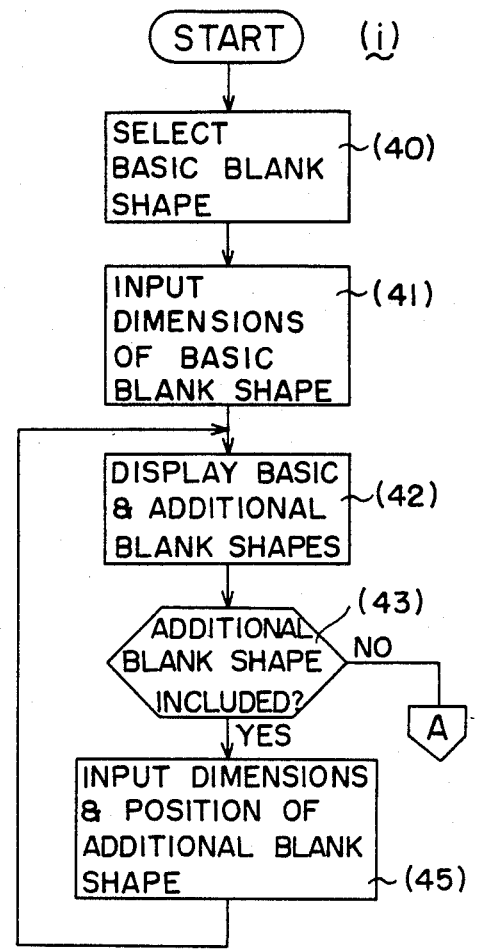
FIGS. 3(a)–3(e) are specific flow charts of a blank shape definition routine, a mounting position definition routine, a machining definition routine, an NC program preparation routine and an interference checking routine which are executed by the microprocessor respectively in steps (i), (ii), (iii), (iv) and (v) of FIG. 2.

Step (i) defines the blank shape of a workpiece to be machined on the machine tool 20. FIG. 3(a) shows specific processings executed in this step.

Generally, workpieces machined by a machine tool called a "machining center" have a number of protrusions and cavities. However, the blank shapes of such workpieces are usually a combination of a number of rectangular parallelepipeds and circular cylinders and are formed with a number of round holes and square holes. For this reason, in this particular embodiment, one rectangular parallelepiped or one circular cylinder is used to define any basic blank shape, and one rectangular parallelepiped, one circular cylinder, one round hole or one square hole is used to define any additional blank shape. Accordingly, the entire shape of any workpiece W can be defined by a combination of one basic blank shape and one or more additional blank shapes.

Figure 8A:
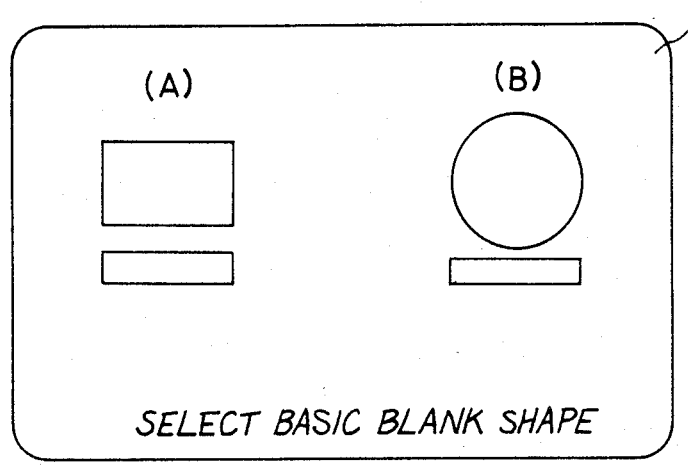
FIGS. 8(a)–8(e) are explanatory views showing images selectively generated on a screen of a CRT display device shown in FIG. 1 when the blank shape definition routine is executed.
Figure 8B:
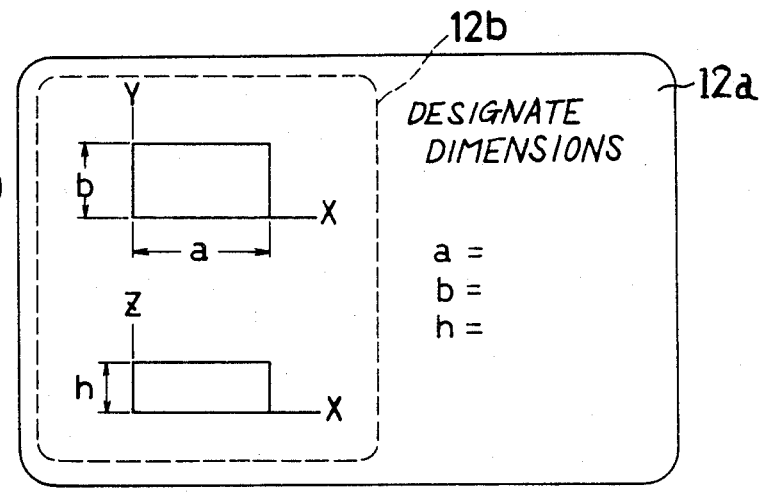

In order to define the blank shape of a workpiece, the microprocessor MPU 10 first executes step 40 of FIG. 3(a), wherein one rectangular parallelepiped and one circular cylinder, as the menu of the basic blank shape, are simultaneously displayed by their plan views and front or elevational views on a screen 12a of the CRT display unit 12, as shown in FIG. 8(a). Such display directs an operator to respond, via the keyboard 11, as to whether the general blank shape of the workpiece W is a rectangular parallelepiped or a circular cylinder. For this purpose, the CRT screen 12a also displays selection marks "(A)" and "(B)" respectively over the plan view of the rectangular parallelepiped and the circular cylinder, along with a message "SELECT BASIC BLANK SHAPE". In response to this, the operator depresses an A-imprinted character key of the keyboard 11 when the general blank shape of the workpiece W is a rectangular parallelepiped or a B-imprinted character key of the keyboard 11 when it is a circular cylinder.

Assuming now that the operator depresses the A-imprinted character key for selection of the rectangular parallelepiped, the microprocessor MPU 10 stores, in a predeteremined area of the random access memory RAM 10c, data indicating that the selected basic blank shape is a rectangular parallelepiped. Then, the microprocessor MPU 10 executes step 41 to erase the screen image shown in FIG. 8(a) and to display the plan and elevational views of a rectangular parallelepiped respectively at upper and lower portions of a scaling zone 12b which occupies the left half of the screen 12a. A message is also displayed at the right portion of the screen 12a for requesting the operator to input data which indicate dimensions (a, b and h) of the workpiece W in the X, Y and Z-axis directions.

Figure 8C:
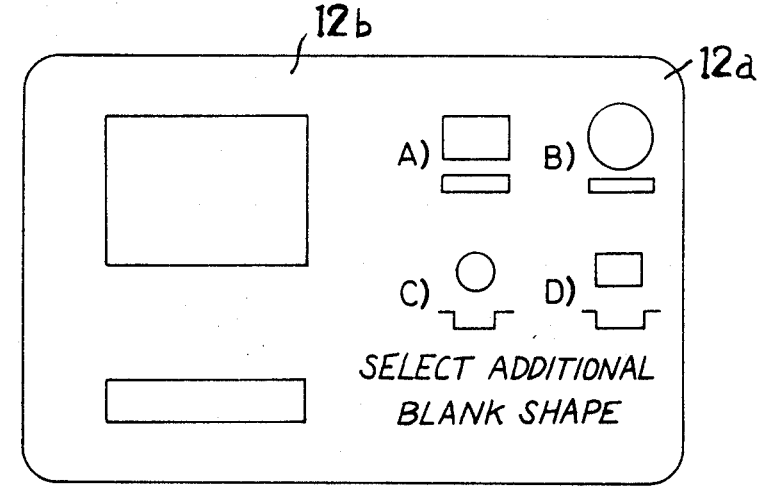

When the operator inputs the dimension data (a, b and h) in response to the message, the microprocessor MPU 10 reads and stores the data in the random access memory RAM 10d for temporary storage. Step 42 then follows, wherein the plan and elevational views of a rectangular parallelepiped having the dimensions so input in longitudinal, transverse and height directions are displayed on the scaling zone 12b of the CRT screen 12a, as shown in FIG. 8(c). At the same time, respective plan and elevational views of four additional blank shapes including one general rectangular parallelepiped, one general circular cylinder, one general round hole and one general square hole are also displayed at the right half of the CRT screen 12, along with a message given at the right-lower portion of the CRT screen 12 to instruct that the operator select one of the four additional blank shapes.

Figure 3B:
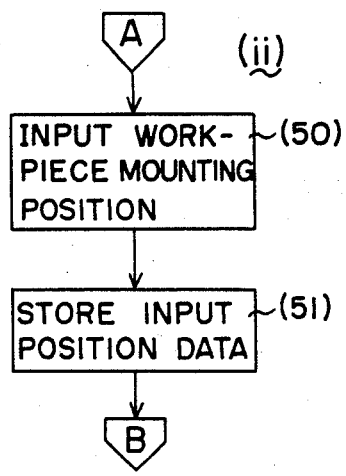
Figure 8D:
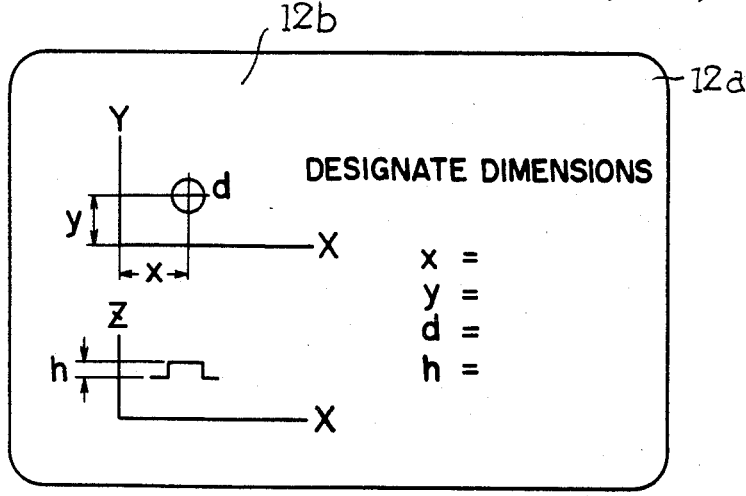
Figure 8E:
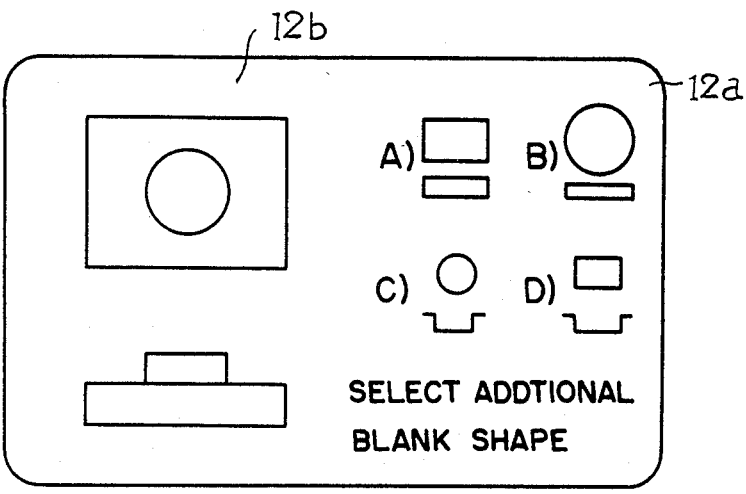

If the workpiece W is a simple rectangular parallelepiped having no additional blank shape, the operator depresses an N-imprinted character key of the keyboard 11, which advances the routine of the microprocessor MPU 10 from step 43 to step 50 of FIG. 3(b) without executing the processing for any additional blank shape. If the workpiece W has a vertical cylindrical boss 20 as exemplified in FIGS. 12(a) and 12(b), however, the operator depresses a B-imprinted character key of the keyboard 11 in correspondence to a selection mark "(B)" which is displayed to the left of the plan and elevational views of the general circular cylinder on the CRT screen 12a. This manipulation by the operator causes the microprocessor MPU 10 to store data indicating that the selected additional blank shape is a circular cylinder and then, to execute step 45, whereby an image shown in FIG. 8(d) is displayed on the CRT screen 12a. The image includes illustrations in which lengths in X and Y-axis directions between the axis of the cylindrical boss 20 and a reference point for the basic blank shape, and the diameter and the height of the cylindrical boss 20 are respectively represented by x, y, d and h. The image further includes a message directing that the operator designate these dimensions (x, y, d and h). It is to be noted herein that in the case where the basic blank shape is a rectangular parallelepiped, the reference point thereof in an X-Y plane uses the left-lower corner of the basic blank shape as viewed in the plan view, and that in the case of the basic blank shape being a circular cylinder, the reference point thereof in the X-Y plane is the axis of the circular cylinder.

In response to the message, the operator successively inputs the designated dimensions (x, y, d and h) by a set of numeric keys of the keyboard 11. Upon completion of this data input, the routine is returned from step 45 to step 42, in which the microprocessor MPU 10 generates a blank shape incorporating the cylindrical boss 20 as an additional blank shape into the rectangular parallelepiped as a basic blank shape, based upon the input data indicative of the dimensions and position of the cylindrical boss 20 and displays plan and elevational views of the generated blank shape at the scaling zone 12b.

The addition of another additional blank shape can be done in succession by repeating manipulations similar to those described above. Exemplifying the workpiece shown in FIGS. 12(a) and 12(b), reference characters P1, P2, P3 and P4 denote holes to be machined, and therefore no additional blank shape is required to be defined. Accordingly, when step 42 is executed after the additional blank shape of the cylindrical boss 20 is defined, an N-imprinted key of the keyboard 11 is depressed because of no additional blank shape information is required. This causes the microprocessor MPU 10 to advance its processing from step 43 to step 50 of FIG. 3(b) with the result of completing the foregoing processings for definition of a blank shape.

Figure 9:
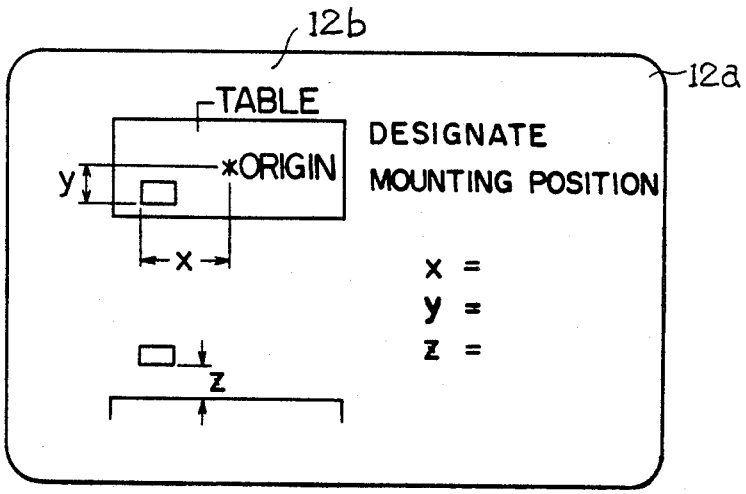
FIG. 9 is an explanatory view showing an image generated on the CRT screen when the mounting position definition routine is executed.

When step 50 of FIG. 3(b) is reached, the microprocessor MPU 10 displays general shapes of the machine tool work table 25 and the basic blank shape as input at the scaling zone 12b of the CRT screen 12a, as shown in FIG. 9. Simultaneously displayed at this time are the symbols x and y, respectively indicating distances in the X and Y-axis directions between the machine origin in the X-Y plane and the reference point of the workpiece W and another symbol Z indicating the distance between the upper surface of the work table 25 and the lower surface of the workpiece W. A message is further displayed to require that the operator designate dimensions respectively corresponding to symbols x, y and z.

Figure 3C:
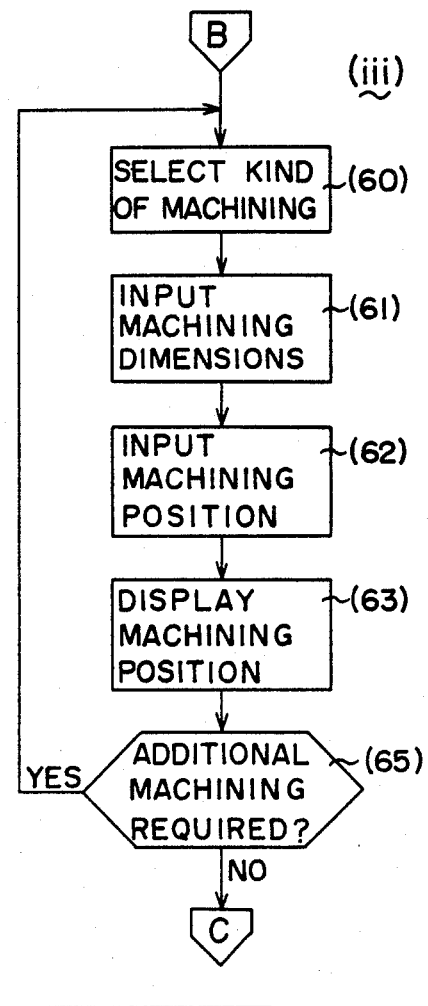

In response to the message, the operator inputs dimension data respectively corresponding to the symbols x, y and z by manipulating the keyboard 11. The microprocessor MPU 10 then executes step 51 to store this data in the random access memory RAM 10c before advancing its processing to step 60 of FIG. 3(c)

Figure 10A:
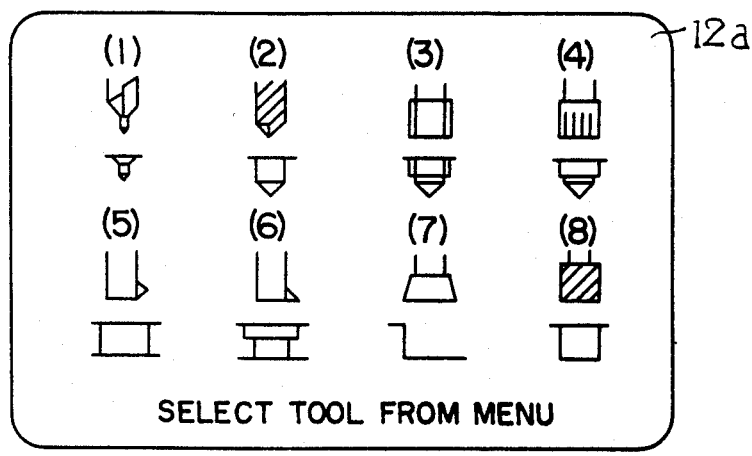
FIGS. 10(a)–10(d) are explanatory views showing images selectively generated on the CRT screen when the machining definition routine is executed.

After completing the processings for definitions of the blank shape and mounting position of the workpiece W in the above-described manner, the microprocessor MPU 10 displays on the CRT screen 12a a menu of tools used in the machine tool 20. This display can be done by displaying on the CRT screen 12a general images of a centering tool, a drilling tool, a tapping tool, a boring tool and the like, as shown in FIG. 10(a), so as to question the operator which tool is to be used for machinings.

Figure 10B:
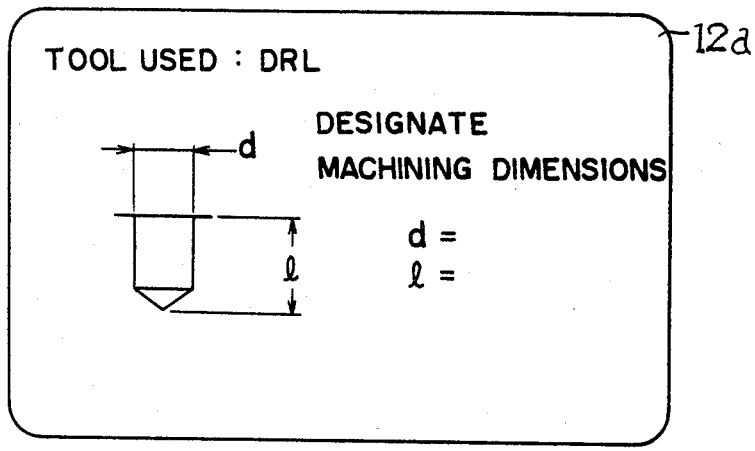
Figure 10C:
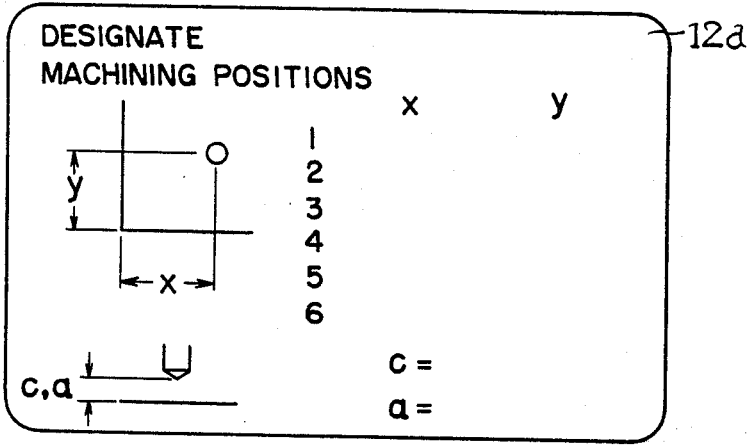
Figure 12A:
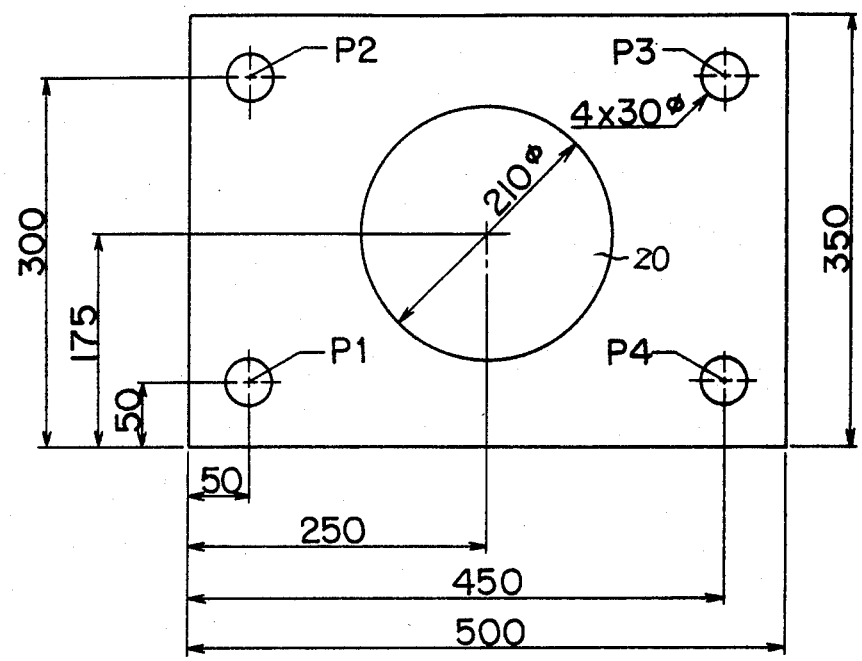
FIGS. 12(a) and 12(b) are explanatory views showing one example of the finished shape of a workpiece.
Figure 12B:
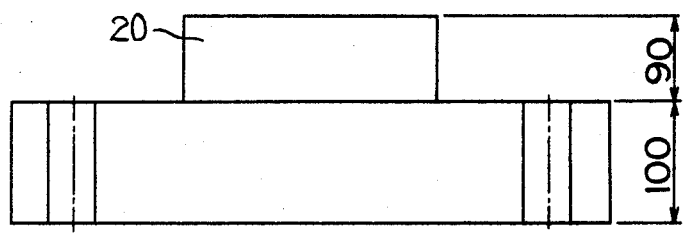

Assuming now that in the machining of the workpiece W shown in FIGS. 12(a) and 12(b), through holes each having the same diameter as one another are to be made respectively at four corner portions P1-P4 of the workpiece W, the operator inputs a numeral "2" by depressing the 2-imprinted numeric key corresponding to data "(2)" over the drilling tool on the CRT screen 12a. The microprocessor MPU 10 then recognizes that the type of machining to be performed is a drilling operation. Step 61 is next executed, wherein the microprocessor MPU 10 displays on the CRT screen 12a the general image of a drilling hole along with a message directing the operator to input data indicative of the diameter (d) and depth (1) of the drilling hole, as shown in FIG. 10(b).

When the diameter (d) and the depth (1) of the drilling hole are input in response to the message, the microprocessor MPU 10 then displays on the CRT screen 12a a general image illustrating the relative positions (x, y) in the X and Y-axis directions between the center of the drilling hole and the reference point of the workpiece W. Another general image is simultaneously displayed to illustrate an air-cut feed amount (a) and the retraction feed amount (c) from the upper surface of the workpiece W. The CRT screen image at this time also includes a message directing the operator to input this necessary data (x, y, a and c).

Figure 3D:
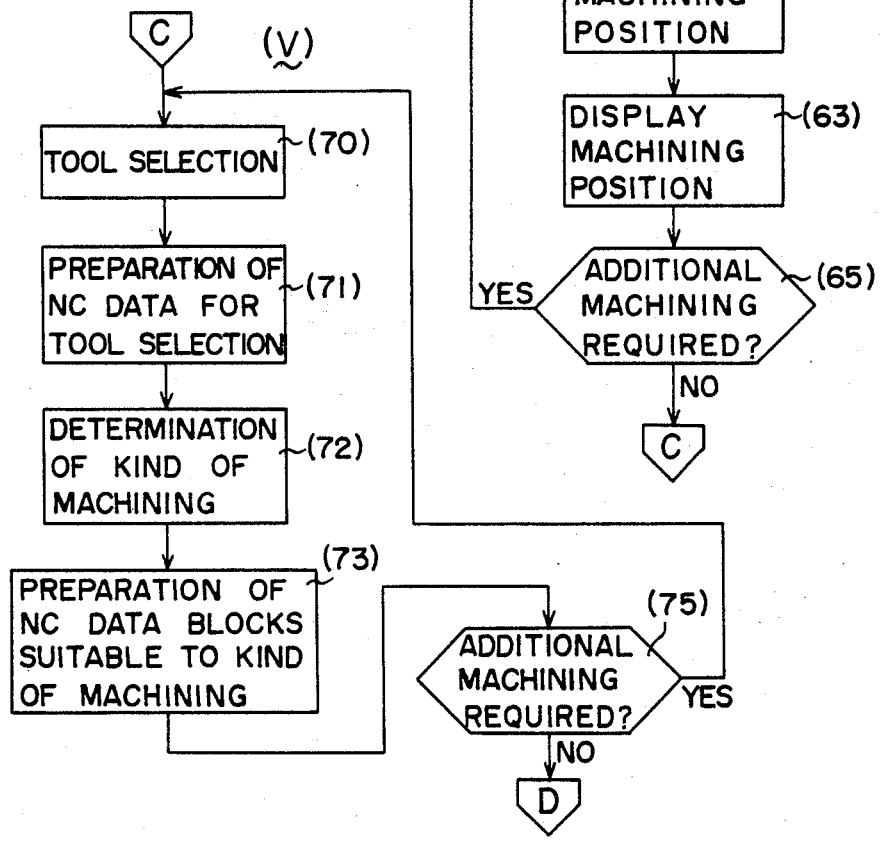
Figure 10D:
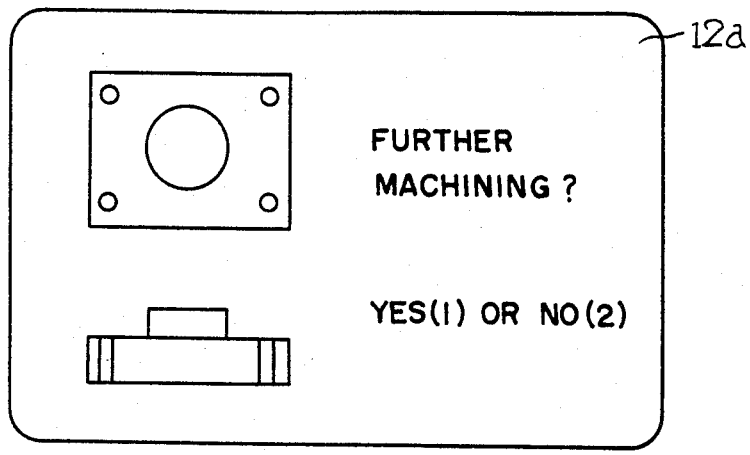

In response to the message, the operator successively inputs the positions of the holes at the four corner positions of the workpiece W by reference to the part drawing and further inputs the retraction feed amount (c) and the air-cut feed amount (a). Step 63 is next executed, wherein the microprocessor MPU 10 displays at the scaling zone 12b of the CRT screen 12a the figures of the holes P1-P4 respectively superposed on portions of the figure of the workpiece blank shape which are designated by the input hole position data, as shown in FIG. 10(d). A message is simultaneously displayed to question the operator as to whether a further machining is required on the workpiece W. Since in this particular instance, only the four through holes P1-P4 should be machined on the workpiece W, the operator at this stage depresses the 2-imprinted key to instruct the microprocessor MPU 10 that no additional machining is required. In response to this, the microprocessor MPU 10 completes the processings for definition of machinings and advances its routine from step 65 to step 70 of FIG. 3(d).

Figure 13:
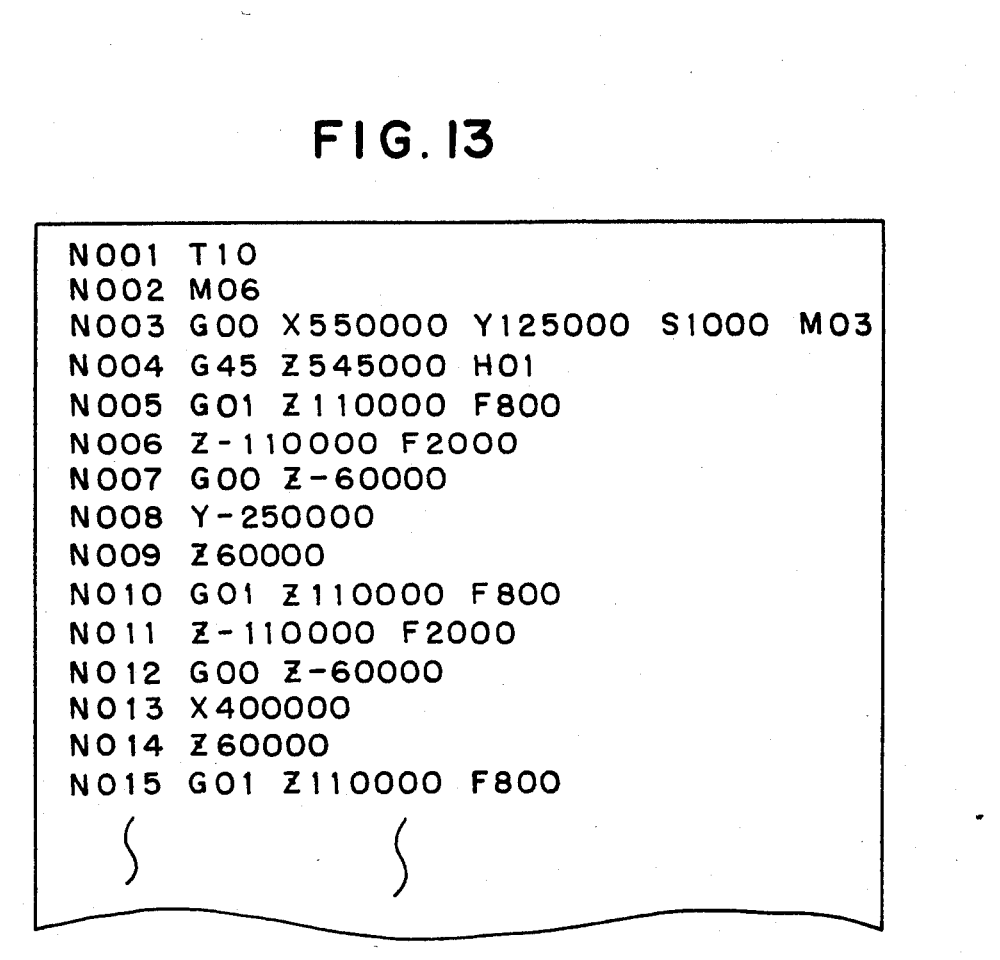

After the definition of machinings is completed in the foregoing manner, the microprocessor MPU 10 executes step 70 to initiate the preparation of an NC program. First of all, in step 70, a tool which is suitable for the type of machining to be performed and the shape to be made by the machining is selected from a plurality of tools which are registered in a tool data file, not shown, stored in the random access memory RAM 10c, and a tool number of the selected tool is identified by reference to the tool data file. When the selection of the tool is completed, the routine of the microprocessor MPU 10 is moved from step 70 to step 71, wherein the microprocessor MPU 10 prepares NC data blocks as instructions that the tool to be used in the first machining step be indexed to a tool exchange position and then be attached to the tool spindle 26. The NC data blocks prepared in this step can be seen at, for example, block numbers "N001" and "N002" of an NC program shown in FIG. 13.

Upon completion of these processings, step 72 checks what type the machining is, and in step 73, an NC program, that is a number of NC data blocks are prepared in a particular order depending upon the type of machining. In the machining example employed herein, the type of machining is a drilling operation, and the NC program is prepared to prescribe that the axis of the tool is successively positioned at the machining positions P1–P4 and that the tool is moved downwardly and then, upwardly along the Z-axis at each of the machining positions P1–P4.

More specifically, program portions each for a drilling cycle are successively prepared with respect to the four machining positions P1–P4. Each program portion prescribes that after the tool is positioned directly over the appropriate machining position by rapid feed movement in the X-Y plane, the tool be moved downwardly to an air-cut feed starting position at a rapid feed rate. The program portion further prescribes that the tool then be moved downwardly to a position which is determined by the position of the upper surface of the workpiece W and the input data indicative of the drilling depth (1), at a predetermined cutting feed rate, and that subsequently, the tool be moved upwardly by the retraction feed amount (c) beyond the upper surface of the workpiece W. The NC program including such program portions is prepared block by block, and a plurality of NC data blocks so prepared are successively stored in an NC data area of the random access memory RAM 10c. When the entire NC program for effecting drilling operations at the four machining positions P1–P4 is completed, the routine of the microprocessor MPU 10 is moved from step 73 to 75, wherein it is determined if an additional machining instructions are provided. Since in this particular instance, the definition of machinings has been made only with respect to the drilling operations at the four machining positions P1–P4, it is deterined that no additional machining instructions have been provided. Consequently, the microprocessor MPU 10 discontinues the processings for NC program preparation by advancing its routine from step 75 to step 80 of FIG. 3(e).

Processings in step 80 and the steps successive thereto are executed for ascertaining, by simulating the prepared NC program, whether a tool which would be presently in the tool spindle 26 or the spindle head 24 would come into engagement with a workpiece W at a rapid feed rate in any positioning feed movement if the tool or the spindle head 24 were actually moved in accordance with the prepared NC program. First of all, step 80 is executed, wherein an interference space which depends upon the previously defined blank shape is determined as a workpiece barrier. Thereafter, step 81 and other steps successive thereto are executed to perform the interference checking. The processings for interference checking involve calculating a path along which the tool would be moved in accordance with a plurality of feed command data included in the prepared NC program, and when each of the feed command data under processing includes a rapid feed command, also involves checking whether the tool would come into engagement with the workpiece W, each time the tool would be moved a predetermined distance. When an interference (i.e., engagement of the tool with the workpiece W at the rapid feed rate) is detected by the simulation of the NC program and the definition of machinings has to therefore be revised, the routine of the microprocessor MPU 10 is returned from step 90 to step 60 of FIG. 3(c), in which the previously defined machinings are revised.

Figure 4:
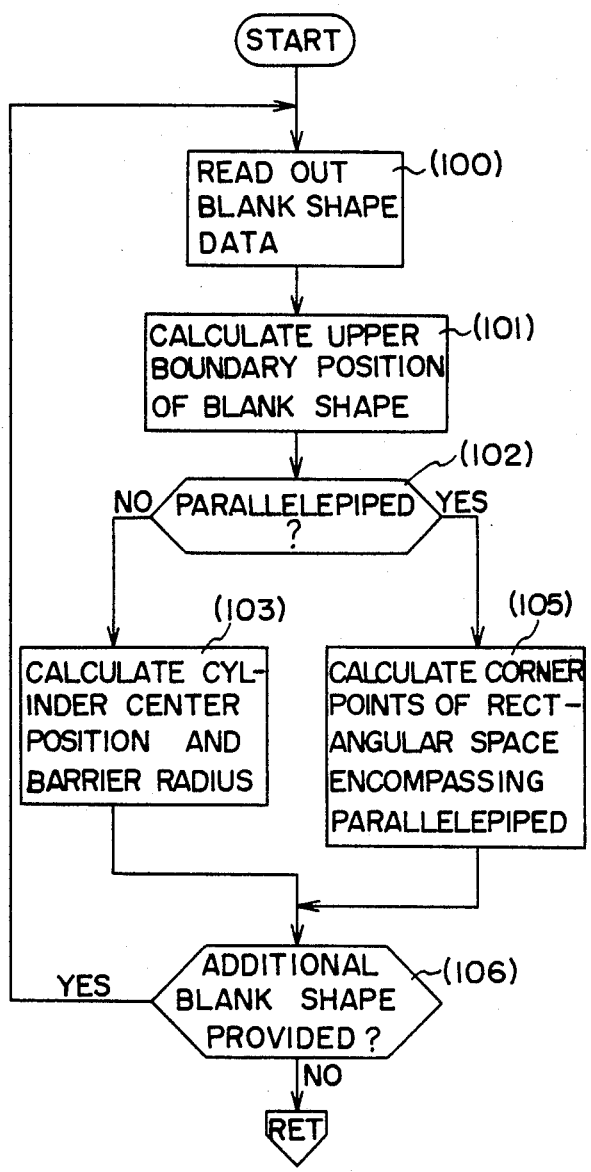
FIG. 4 is a specific flow chart of a workpiece barrier setting routine executed by the microprocessor in step 80 of FIG. 3(e)

FIG. 4 shows specific processings that the microprocessor MPU 10 executes in step 80 for generating the workpiece barrier. In the case where a workpiece blank shape includes a bore, the workpiece barrier may be determined taking the bore into consideration. However, the determination of the workpiece barrier will be described hereinafter without taking into consideration any bore for the sake of brevity.

At the beginning, data indicating the first input blank shape or the basic blank shape is read out in step 100, and a boundary of an interference space for the basic blank shape in a vertical direction is obtained by calculation in step 101. As can be seen in FIG. 14b, the interference space boundary in the vertical direction is set to be higher by a clearance (S) than the upper surface of the workpiece W. The clearance (S) is the sum of the air-cut feed amount (a) already input in the definition of machinings and a predetermined distance ($\alpha$). A Z-axis coordinate value (Zn) of the interference space boundary is calculated based upon a height dimension of the basic blank shape, a vertical space between the work table 25 and the basic blank shape (workpiece W) mounted thereon, the air-cut feed amount (a) and a Z-axis coordinate value of the upper surface of the work table 25.

Step 102 is then reached, wherein it is ascertained whether the basic blank shape is a circular cylinder or a rectangular parallelepiped. In the case of the basic blank shape being a circular cylinder, step 103 is followed, wherein absolute coordinate values (Xw, Yw) of the center of the circular cylinder in the X-Y plane are calculated based upon the workpiece mounting position data and other data. A workpiece barrier radius (Rw) is further calculated by adding the aforementioned clearance (S) to a radius of the circular cylinder. Step 105 is executed after step 102 in the case where the basic blank shape is a rectangular parallelepiped, as in this particular embodiment. As shown in FIG. 15(b), absolute coordinate values (Xw1, Yw1), (Xw1, Yw2), (Xw2, Yw1) and (Xw2, Yw2) of the points which are respectively outwardly offset by the clearance (S) from four corners of the upper surface of the rectangular parallelepiped in the X and Y-axis directions are calculated based upon the workpiece mounting position data and the blank shape dimension data.

More specifically, in this embodiment, the center of the work table 25 constitutes an origin of the machine tool coordinate system in the X-Y plane, and thus, distances in the X and Y-axis directions between the left-lower corner WRP as viewed in FIG. 15(b) and the center of the work table 25 are input as the workpiece mounting position data. Furthermore, since positive directions of the X and Y-axes are respectively to the right and downward as viewed in FIG. 15(b), the coordinate value (Xw1) is calculated by subtracting the clearance (S) from the position data (x) already input as part of the workpiece mounting position data, and the coordinate value (Yw1) is calculated by adding the clearance (S) to the position data (y) also already input as another part of the workpiece mounting position data. Of the coordinate values (Xw2) and (Yw2) which define the four corner points together with the coordinate values (Xw1) and (Yw1), the value (Xw2) is calculated by adding the length of the basic blank shape in the X-axis direction and twice the clearance (S) to the calculated coordinate value (Xw1), and the value (Yw2) is calculated by subtracting the length of the basic blank shape in the Y-axis direction and twice the clearance (S) from the calculated coordinate value (Yw1).

Upon completion of these processings, the microprocessor or MPU 10 ascertains in step 106 whether an additional blank shape has been input or not. If it has been input, return is made from step 106 to step 100, whereby a boundary of an interference space for the additional blank shape is obtained in the same mode of procedure as described above. Data which indicate the position of the additional blank shape relative to the reference point of the basic blank shape are utilized in setting a boundary for the additional blank shape. Since the embodiment disclosed includes a circular cylinder defined as an additional blank shape, a boundary of an interference space for the additional blank shape is also set over and around the circular cylinder portion protruding upwardly from the workpiece W, as shown in FIG. 14.

Figure 3E:
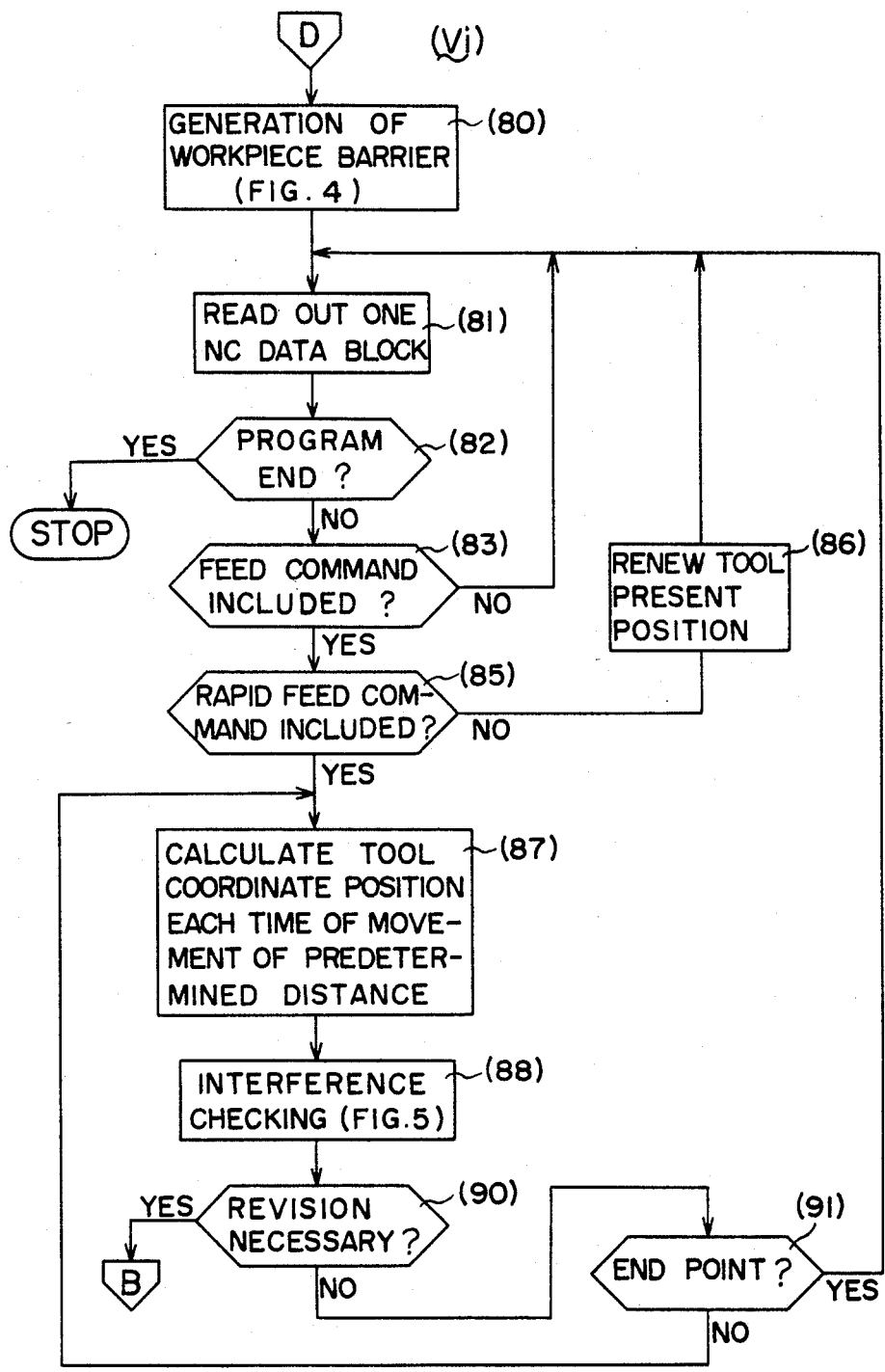
Figure 5:
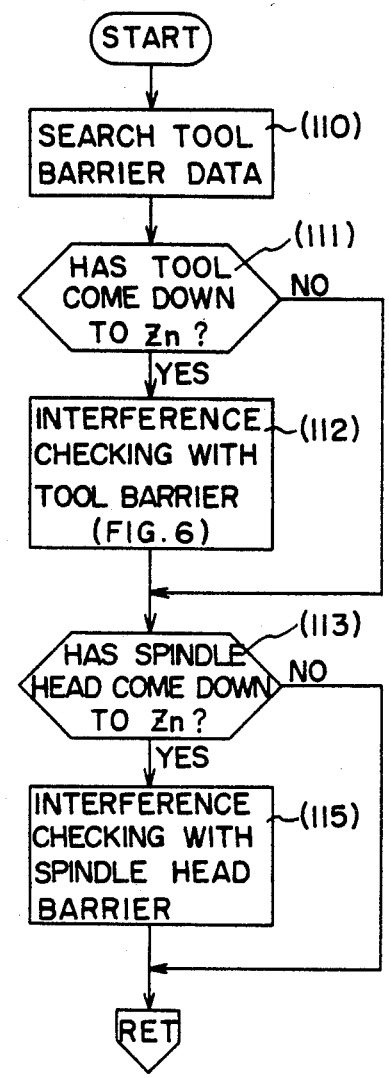
FIG. 5 is a specific flow chart of a routine executed by the microprocessor in step 88 of FIG. 3(e)

After the boundaries of the workpiece interference space are set in this manner, processings in steps 81-91 of FIG. 3(e) are executed to simulate the prepared NC program and to perform an interference checking in step 88 each time the tool would be moved by a predetermined distance at the rapid feed rate, as mentioned earlier. In this step, checking is done for the interference between the tool and the workpiece and also for interference between the spindle head 24 and the workpiece W, as specifically indicated at steps 112 and 115 in FIG. 5.

More specifically, step 110 is first executed, wherein the tool barrier data corresponding to a tool which would presently be in use in the tool spindle 26 is selected from a plurality of tool barrier data stored in the random access memory RAM 10c. The plurality of tool barrier data is defined respectively for tools stored in the tool magazine 27 and respectively represent interference spaces of the tools. Then, it is ascertained in step 111 whether or not the lower end surface SA of the tool barrier Bt for the tool would be positioned below the interference space boundary Zn in the Z-axis direction which has been set over the top surface of the workpiece W. This determination is carried out based upon the position that the spindle head 24 would occupy, data indicate of the tool length being included in the selected tool barrier data and the like. When it is ascertained that the lower end surface SA would be below the interference space boundary Zn, an interference between the tool barrier Bt and the workpiece barrier Bw is checked in step 112. Subsequently, it is ascertained in step 113 whether the lower end surface SB of a spindle head barrier Bh would be positioned below the interference space boundary Zn or not. The position that the spindle head 24 would occupy and data indicative of the spindle head barrier Bh which defines an interference space for the spindle head 24 are taken into consideration for this determination. When it is ascertained that the lower end surface SB of the spindle head barrier Bh would be below the workpiece interference space boundary Zn, step 115 is then executed to check for interference between the workpiece barrier Bw and the spindle head barrier Bh.

Figure 14:
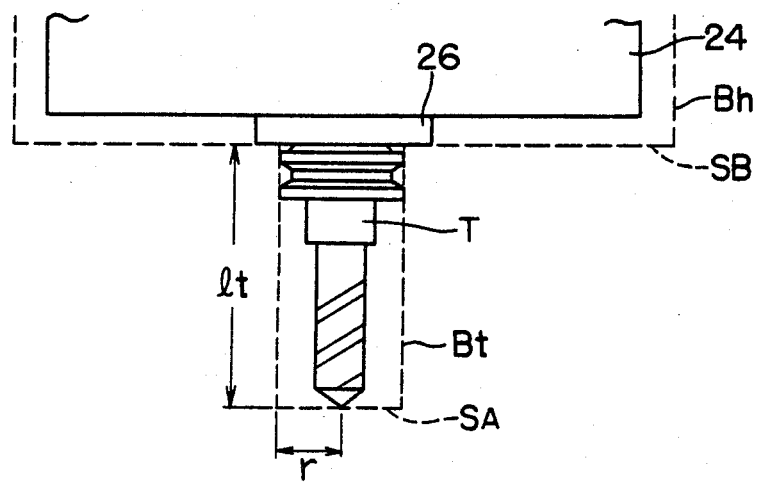
FIGS. 14(a) and 14(b) are explanatory views showing a workpiece barrier, a tool barrier and a spindle head barrier.
Figure 14:
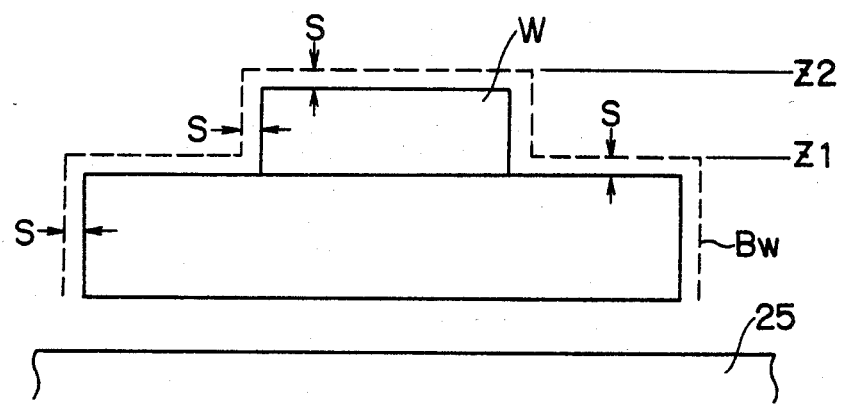

As can be seen in FIG. 14a, the above-noted tool barrier Bt is defined by a length (lt) between the lower end surface of the tool spindle 26 and the lower end of each tool T received in the tool spindle 26 and a tool barrier radius coinciding with the tool radius. The tool barrier radius for each tool T whose cutting portion is smaller in diameter than a grip portion thereof is chosen to coincide with the radius of the grip portion, while the tool barrier radius (r) for each tool T whose cutting portion is larger in diameter than a grip portion thereof is chosen to coincide with the radius of the cutting portion. Further, as can be seen also in FIG. 14, the spindle head barrier Bh is defined by an X-Y plane including the lower end surface of the tool spindle 26 and four vertical planes encompassing the spindle head 24.

The tool barrier Bt has a circular cross section taken along the X-Y plane although the spindle head barrier Bh has a rectangular cross section taken along the X-Y plane. This causes a slight difference in the method of processing between interference checkings respectively executed in steps 112 and 115. However, these interference checkings are substantially the same, and for the saske of brevity, only the interference checking which uses the tool barrier Bt, as executed in step 112 will be described in detail hereinafter.

Figure 6:
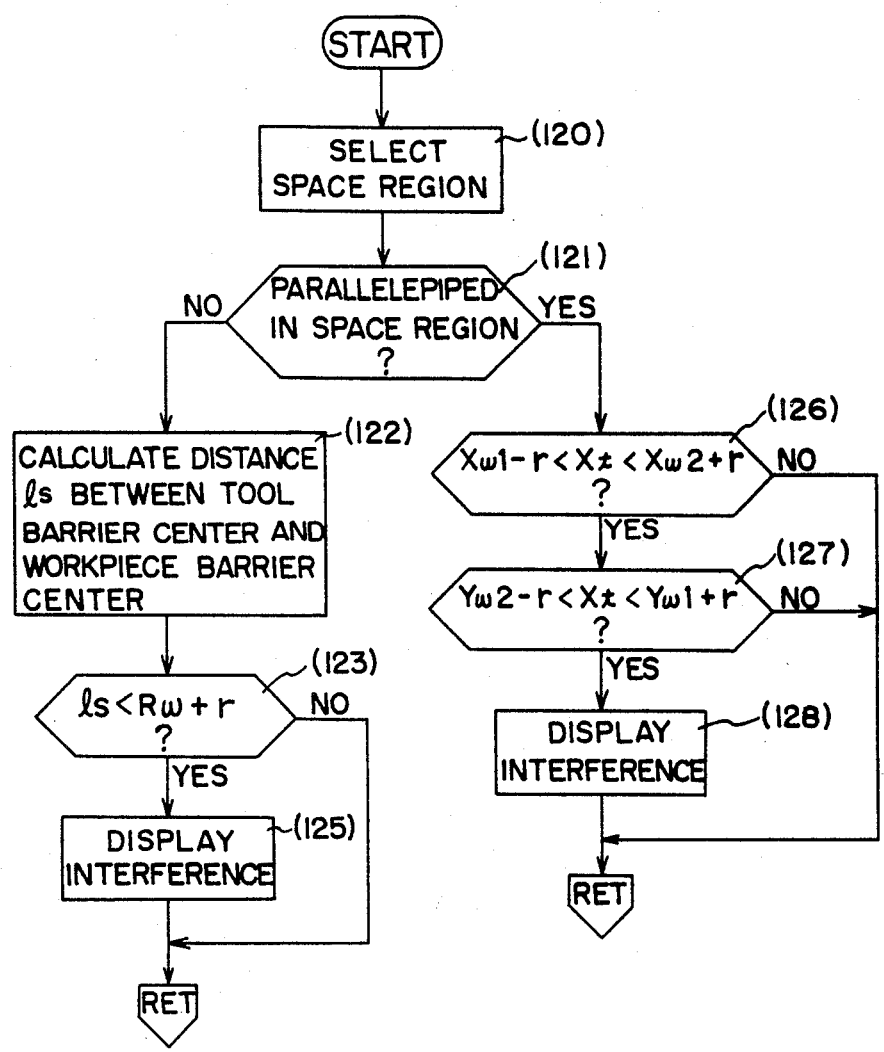
FIG. 6 is a specific flow chart of a routine executed by the microprocessor in step 112 of FIG. 5.
Figure 15A:
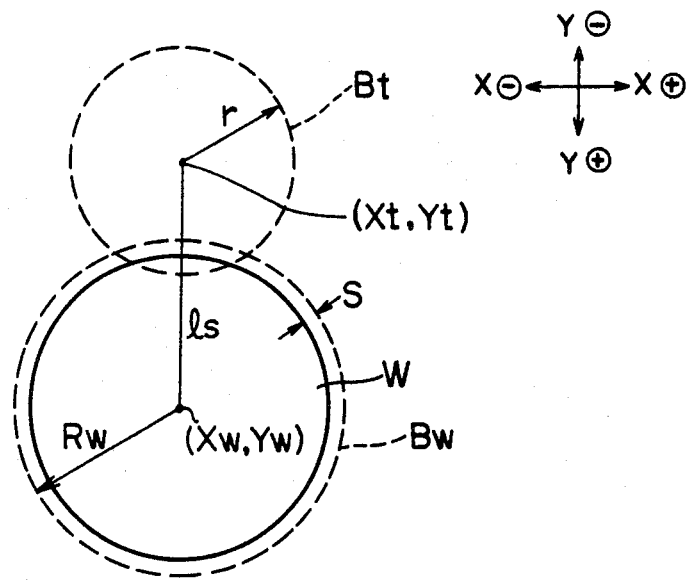
FIGS. 15(a) and 15(b) are explanatory views respectively showing a relative positional relation between the tool barrier and a workpiece barrier and another relative positional relation between the tool barrier and a different workpiece barrier.
Figure 15B:
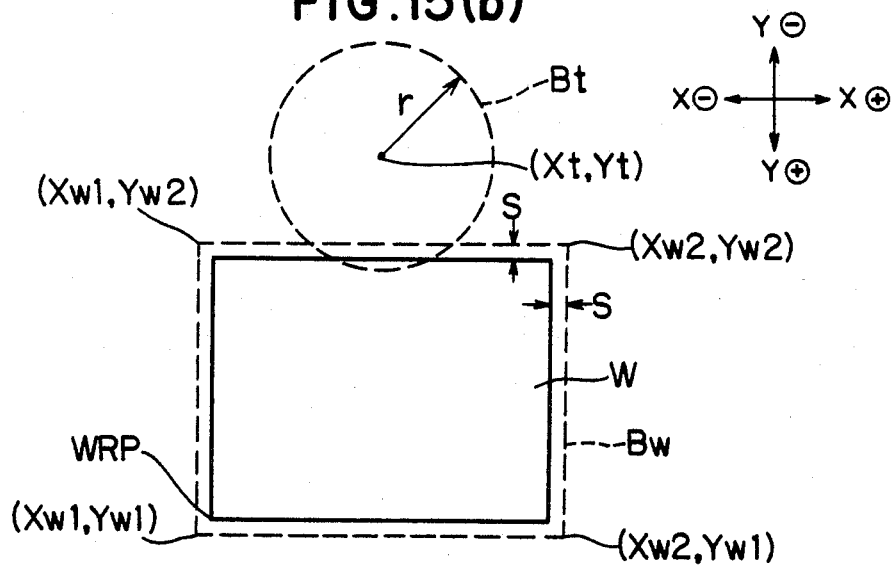

FIG. 6 shows specific processings for the interference checking using the tool barrier Bt. Step 120 is first executed to find out which space region in the X-axis direction the lower end surface SA of the tool barrier Bt is located in. That is, it is ascertained in this particular embodiment whether the position of the lower end surface SA in the Z-axis direction would be in the barrier defined for the basic blank shape or in the barrier defined for the additional blank shape. Determination is then made in step 121 as to whether the blank shape having the barrier in which the lower end surface SA resides is a rectangular parallelepiped or a circular cylinder, and interference processings depending upon such determination are thereafter executed.

Where the blank shape is a circular cylinder, an interference is expected to occur between a circle and another circle, as schematically illustrated in FIG. 15(a). As noted by reference to steps 122 and 123, the occurrence of an interference is detected when the distance (ls) between the axis of the tool and the additional blank shape becomes smaller than a value which is calculated by the addition of the tool barrier radius (r) to the workpiece barrier radius (Rw). On the other hand, where the blank shape is a rectangular parallelepiped, an interference is expected to occur between a circle and a rectangle in the X-Y plane, as schematically illustrated in FIG. 15(b). Steps 126-128 are executed to ascertain whether or not, the tool barrier Bt would have entered into the workpiece barrier Bw generated in step 80, and this results in checking for the occurrence of an interference. This interference checking process uses the absolute coordinate values (Xw1, Yw1), (Xw1, Yw2), (Xw2, Yw1) and (Xw2, Yw2) which have been calculated in the foregoing step 105 for the four corner points of a square or rectangular defining a part of the workpiece barrier Bw in the X-Y plane.

The workpiece W exemplified herein has a shape which is made by building up a circular cylinder blank shape on a rectangular blank shape. In the embodiment described herein, therefore, the interference checking according to the processings in steps 122 and 123 is executed when the lower end surface SA of the tool barrier Bt would move downwardly beyond the highest level of the barrier defined for the additional blank shape. The interference checking according to the processings in steps 126-128 is then executed when the lower end surface SA of the tool barrier Bt further would move downwardly beyond the highest level of the barrier defined for the basic blank shape.

Figure 11:
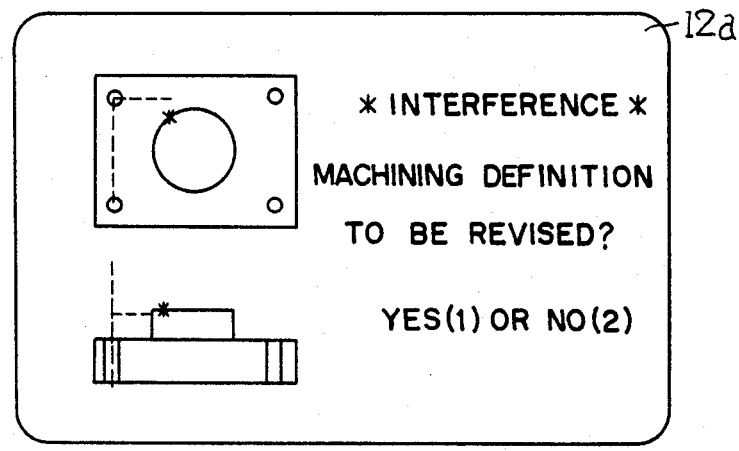
FIG. 11 is an explanatory view showing an image generated on the CRT screen in step 125 or step 128 of FIG. 6.

As the simulation of the prepared NC program is executed in the foregoing manner for interference checking, the moving path of the tool concerned is displayed on the screen 12a of the CRT display unit 12, superposed on each of the plan and elevational views which are simultaneously displayed to show the workpiece blank shape. When an interference is detected during this simulation, the occurrence of an interference is conveyed to the operator. This is done as shown in FIG. 11, by displaying at the right portion of the CRT screen 12a a message indicating the occurrence of the interference and by further displaying an interference indication mark (*) at the location on each of the displayed plan and elevational views where the interference occurs.

The operator, when so informed, depresses the 1-imprinted numeric key of the keyboard 11 in step 90 to instruct the microprocessor MPU 10 that the defined machining data be revised. In response to this, the microprocessor MPU 10 returns its operation to step 60 of FIG. 3(c) to execute the machining definition routine again. The tool retraction amount (c) must be increased in order to avoid the interference. Accordingly, when step 62 is executed, the operator changes the previously set tool retraction amount (c) to a larger one, whereby the revision of the defined machining data is completed.

Although, in the above-described embodiment, the interference checking is executed by simulating an NC program immediately after completion of an automatic programming processing, it may be executed in parallel time relation with the execution of the numerical control operation in which the machine tool 20 is actually operated in accordance with the NC program. In this case, during the execution of the numerical control operation, the positions of the tool and the workpiece are detected at predetermined time intervals, and the checking for interference is executed based upon the detected positions of the tool and the workpiece. The operation of the machine tool 20 is discontinued when the occurrence of the interference is detected. Furthermore, the above-described embodiment is designed to execute the interference checking processing only when any positioning feed movement would be performed at a rapid feed rate. It is however possible to execute the interference checking also when any positioning feed movement would be performed at any slower feed rate than the rapid feed rate. In this case, the microprocessor MPU 10 regards any feed movement as a positioning feed movement when any feed movement is executed at any higher feed rate than a predetermined feed rate, and executes the interference checking processing during any such feed movement.

Obviously, numerous modifications and variations of the present invention are possible in light of the above teachings. It is therefore to be understood that within the scope of the appended claims, the invention may be practiced otherwise than as specifically described herein. What is claimed as new and desired to be secured by Letters Patent of the United States is:

1. In a machine tool numerical controller for controlling relative movement between a tool spindle and a work table respectively carrying a tool and a workpiece to be machined in accordance with a numerical control program, the improvement comprising:

data input means for inputting blank shape data indicating the blank shape and dimensions of said workpiece and mounting position data indicating the mounting position of said workpiece on said work table;

data storage means for storing said numerical control program and said blank shape data and said mounting position data input by said data input means;

calculation means connected to said data storage means for obtaining by calculation a workpiece interference space defined outwardly from the outer periphery of said workpiece, based upon said blank shape data and said mounting position data stored in said data storage means; and interference detection means for detecting a rapid feed interference when engagement between either said tool or a tool interference space defined outwardly from the outer periphery of said tool with said workpiece interference space is confirmed by one of a calculation performed by said calculation means during a simulation of said program and actual relative movement between said tool spindle and said work table during actual operation of said tool in accordance with said numerical control program.

2. In a machine tool numerical controller for controlling relative movement between a tool spindle and a work table respectively carrying a tool and a workpiece to be machined in accordance with a numerical control program, the improvement comprising:

data input means for inputting blank shape data indicating the blank shape and dimension of said workpiece and mounting position data indicating the mounting position of said workpiece on said work table;

data storage means for storing said numerical control program, said blank shape and mounting position data input by said data input means and a tool interference space defined outwardly from the outer periphery of said tool;

first calculation means connected to said data storage means for obtaining by calculation a workpiece interference space defined outwardly from the outer periphery of said workpiece, based upon said blank shape data and said mounting position data stored in said data storage means;

second calculation means connected to said data storage means for calculating based upon said numerical control program a tool path along which said tool spindle would be moved relative to said work table in accordance with said numerical control program; and interference detection, means for detecting by calculation based upon said tool path, said tool interference space and said workpiece interference space, whether one of said tool and said tool interference space would be engaged with said workpiece interference space during any rapid feed positioning movement if relative movement between said tool spindle and said work table were controlled in accordance with said numerical control program.

3. A machine tool numerical controller as set forth in claim 2, further comprising:

data read-out means connected to said data storage means for successively reading out therefrom a plurality of NC data blocks constituting said numerical control program; and means responsive to each of said NC data blocks read out from said data read-out means for ascertaining whether each of said NC data blocks includes a rapid feed rate command and for causing said second calculation means and said interference detection means to operate each time one of said NC data blocks is ascertained to include said rapid feed rate command.

4. A machine tool numerical controller as set forth in claim 3, wherein:

said second calculation means is responsive to each of said NC data blocks including said rapid feed rate command for calculating a coordinate position to which said tool spindle would be moved each time said tool spindle is moved by a predetermined distance relative to said work table in accordance with one of said NC data blocks including said rapid feed rate command; and said interference detection means being responsive to said calculated coordinate position, said tool interference space and said workpiece interference space for detecting by calculation whether one of said tool and said tool interference space would be engaged with said workpiece interference space if said tool spindle were moved to said coordinate position.

* * * * *